Nov. 6, 1934.   F. C. MARTINI   1,979,979
GARDEN MARKER
Filed Sept. 14, 1932
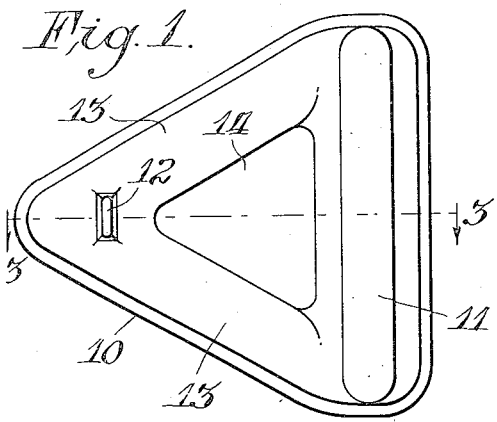
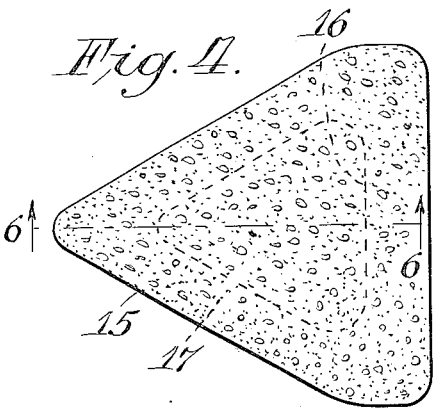
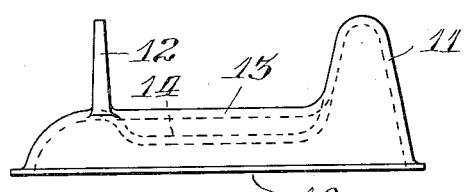
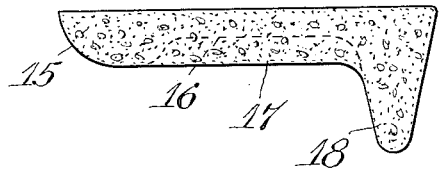
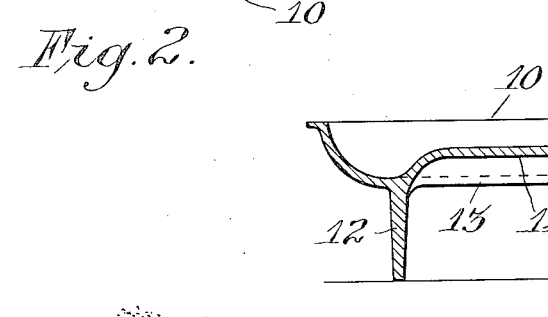
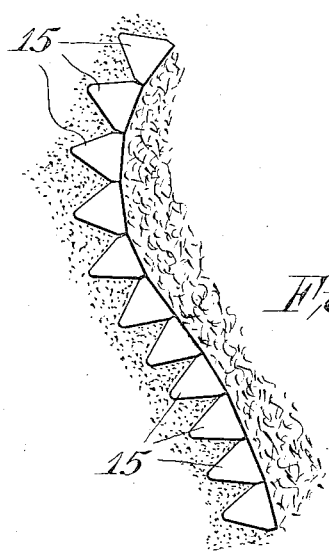
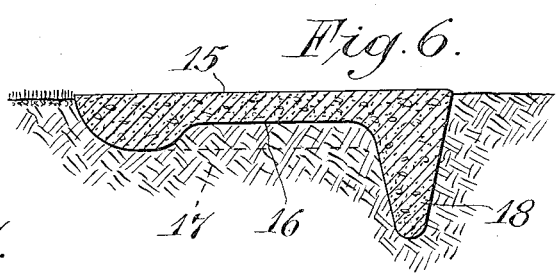
Inventor
Frederick Carl Martini,
By Paul O. Pippel
Atty.

Patented Nov. 6, 1934

1,979,979

UNITED STATES PATENT OFFICE 1,979,979

GARDEN MARKER

Frederick Carl Martini, Chicago, Ill.

Application September 14, 1932, Serial No. 633,040

5 Claims. (Cl. 47—33)

My invention relates to a garden marker.

Such device particularly is useful in forming a marked line of demarkation, or edging, between lawn and flower or vegetable beds; or, between lawn and path, or to delineate either edge of a path.

The objects of the invention are to provide a novel garden marker or edging device of the kind stated which will be simple and cheap to manufacture; to provide such a device in molded form; and lastly to provide such a marker which includes in its structure means for firmly and securely holding the marker in the ground in a manner to prevent its displacement. Another object is to provide such a marker which has great possibilities insofar as concerns the arrangement of a line or series of these markers so that ornamental lines thereof may be placed in straight or curved lines in conformity with garden design and layouts of beds or the like, with the thought that neatness and orderliness in gardening arrangements may be facilitated.

These desirable objects may be achieved in the preferred form of the invention illustrated in the accompanying sheet of drawings, in which form briefly, a mold is provided having a shape to produce a molded marker of integral construction having a substantially horizontal marker portion of the desired geometric shape, and a substantially right angularly disposed projection to serve as an anchoring means for securely holding the marker in position in the ground. Other features are included in the construction which will later be made known.

In this sheet of drawings:

Figure 1 is a bottom plan view of the mold;

Figure 2 is a side elevational view of the mold in upended position;

Figure 3 is a vertical cross sectional view through the mold as seen along the line 3—3 in Figure 1, looking in the direction of the arrows;

Figure 4 is a top plan view of the marker per se;

Figure 5 is a side view thereof;

Figure 6 is a vertical cross sectional view through the marker as seen along the line 6—6 appearing in Figure 4, the marker additionally being shown in position in the ground; and, Figure 7 is a plan view of a series of these markers arranged in wavy lines to illustrate one manner of their use in a garden.

The mold of this invention as shown in Figures 1, 2 and 3 comprises a polygonally shaped, and in the present disclosure, a substantially triangularly shaped form 10 of shallow depth, as indicated, and along the base line of the triangle, said form being extended or dropped a distance downwardly as at 11. Adjacent the apex of the triangle, and on its under side, the form is provided with a projection 12 for a purpose later to appear. Merging with the dropped portion 11, the sides of the form are provided with a depressed, troughlike peripheral edge 13 leaving a flat, horizontally disposed, raised, center portion 14.

The mold is placed in a stable position on a table or the like, as shown in Figure 3, and tamped and packed full of a cementitious or concrete preparation (or any other moldable mixture as desired). The mixture may be dry packed, or wet and allowed to set in the mold. Eventually it is removed by upending the mold as shown in Figure 2, the projection 12 serving as a finger hold while the portions 11 and 14 are gently tapped with an appropriate tool to loosen the molded marker from the mold in an obvious manner.

As shown in Figures 4, 5 and 6 the molded marker will conform in shape to the mold, thus presenting a triangularly shaped, flat, horizontal marker portion 15, with a pocket 16 formed on its under side, bounded along two sides by the bead 17, and along the base edge of the triangle there extends downwardly the projected portion 18 which is disposed at a right angle to the body or marker portion 15.

In use the marker is set into the ground in the manner appearing in Figure 6 where the projection 18 impales the ground in the manner shown to anchor the marker securely in place, the horizontal top surface 15 remaining exposed to leave an ornamental marker, after the fashion shown in Figure 7 where a series of these markers are arranged uniformly to form a sinuous edging, let us say, between a lawn bed and flower bed. As shown in Figure 7 S-curves can be provided, or any other formation, such as circular, to fit the requirements of garden layouts and the individual artistic sense of the user.

If these garden markers serve as stepping stones, or path markers, where they may be subjected to the weight of a person treading thereon, or from the shock received thereby when a lawn mower operates thereover, it is found that the beaded edges 17 serve to prevent rocking movement of the marker, as the ground locks into the pocket 16 formed on the under side of the marker. Thus, double assurance is provided to maintain the markers against accidental displacement.

From this disclosure it must now be apparent that a novel garden accessory has been provided to achieve the desirable objects heretofore recited. Due to simplicity of construction both the mold and marker are capable of commercial exploitation.

It is the intention to cover all such changes and modifications of the illustrative design of marker herein chosen for purposes of the disclosure, which do not depart from the spirit and scope of the invention set forth in the appended claims.

What I claim is:

1. A garden marking device having a horizontal substantially triangularly shaped, flat marker portion and a substantially right angularly disposed anchoring projection from the base edge of the triangle, said flat portion adapted in position to lie substantially at ground level, and a bead along the edge of the under or ground side of the marker portion to prevent rocking of the marker when in position on the ground.

2. A garden marking device adapted to be imbedded in the ground with only its top surface exposed to view and lying substantially at ground level, said device comprising a horizontal portion providing the exposed top surface, said top surface being relatively smooth and uninterrupted to adapt the same for stepping stone service, and a projection on the under side of the horizontal portion and substantially normal thereto, said projection serving as a ground anchor.

3. An integrally molded garden marking device adapted to be imbedded in the ground with only its top surface exposed to view and lying substantially at ground level, said device comprising a polygonally shaped horizontal portion providing the exposed top surface, said top surface being flat to adapt the same for stepping stone service, and a substantially right angularly disposed ground anchor projection extending from the under side of the horizontal portion.

4. An integrally molded garden marking device adapted to be imbedded in the ground with only its top surface exposed to view and lying substantially at ground level, said device comprising a polygonally shaped horizontal portion providing the exposed top surface, said top surface being flat to adapt the same for stepping stone service, a substantially right angularly disposed ground anchor projection extending from the under side of the horizontal portion, and a peripheral flange on the under side of the horizontal portion of less depth than the projection to prevent rocking of the device in the ground when tread upon.

5. A garden marking device adapted to be imbedded in the ground with only its top surface exposed to view and lying substantially at ground level, said device comprising a polygonally shaped horizontal portion providing the exposed top surface, said top surface being flat to adapt the same for stepping stone service, a substantially right angularly disposed ground anchor projection extending from the under side of the horizontal portion and along one side edge thereof, and a depending marginal bead adjacent a remaining side edge of the under side of the horizontal portion and of less depth than the projection to prevent said device from rocking in the ground when tread upon.

FREDERICK CARL MARTINI.